US012623525B2

(12) United States Patent
Maeda et al.

(10) Patent No.: US 12,623,525 B2
(45) Date of Patent: May 12, 2026

(54) UNIT

(71) Applicant: JATCO Ltd, Fuji (JP)

(72) Inventors: Atsushi Maeda, Hadano (JP); Minoru Shoichi, Hiratsuka (JP); Hiroki Uehara, Hadano (JP); Akira Suwabayashi, Isehara (JP)

(73) Assignee: JATCO Ltd, Fuji (JP)

( * ) Notice: Subject to any disclaimer, the term of this patent is extended or adjusted under 35 U.S.C. 154(b) by 0 days.

(21) Appl. No.: 18/872,974

(22) PCT Filed: May 12, 2023

(86) PCT No.: PCT/JP2023/017853
§ 371 (c)(1),
(2) Date: Dec. 9, 2024

(87) PCT Pub. No.: WO2023/243276
PCT Pub. Date: Dec. 21, 2023

(65) Prior Publication Data
US 2025/0353366 A1      Nov. 20, 2025

(30) Foreign Application Priority Data

Jun. 13, 2022    (JP) ................................. 2022-095068

(51) Int. Cl.
| | |
|---|---|
| *B60K 1/00* | (2006.01) |
| *B60K 17/16* | (2006.01) |
| *B60L 15/00* | (2006.01) |
| *F16H 37/08* | (2006.01) |

(52) U.S. Cl.
CPC .............. *B60K 1/00* (2013.01); *B60K 17/165* (2013.01); *B60L 15/007* (2013.01); *F16H 37/0813* (2013.01); *B60K 2001/001* (2013.01)

(58) Field of Classification Search
CPC .. B60K 1/00; B60K 17/165; B60K 2001/001; B60L 15/007; F16H 37/0813
See application file for complete search history.

(56) References Cited

U.S. PATENT DOCUMENTS

| | | | |
|---|---|---|---|
| 6,401,850 B1 * | 6/2002 | Bowen ..................... B60K 6/26 | |
| | | | 903/910 |
| 2017/0057349 A1 * | 3/2017 | Ogawa .................. F16H 57/037 | |
| 2022/0274484 A1 | 9/2022 | Jinnai et al. | |
| 2023/0085115 A1 * | 3/2023 | Kitanaka ................ H02K 5/203 | |
| | | | 310/71 |
| 2025/0137528 A1 * | 5/2025 | Katayama ................ B60K 1/00 | |
| 2025/0155013 A1 * | 5/2025 | Mitsuhashi ......... F16H 57/0479 | |

FOREIGN PATENT DOCUMENTS

WO      WO-2021/131204 A1      7/2021

\* cited by examiner

*Primary Examiner* — Farhana Pervin
(74) *Attorney, Agent, or Firm* — Foley & Lardner LLP

(57) ABSTRACT
A unit includes: a rotating electrical machine; an inverter located in an outer periphery of the rotating electrical machine; a first gear connected downstream of the rotating electrical machine; a second gear to mesh with the first gear; a third gear connected downstream of the second gear via a shaft; and a fourth gear to mesh with the third gear. The shaft has a portion that overlaps a stator of the rotating electrical machine when viewed in a radial direction, and the inverter has a portion that overlaps the second gear when viewed in an axial direction.

3 Claims, 3 Drawing Sheets

UNIT

TECHNICAL FIELD

The present invention relates to a unit.

BACKGROUND ART

Patent Document 1 discloses a vehicle drive device including a counter gear mechanism that reduces a speed. The vehicle drive device transmits output torque of a rotating electrical machine to a pair of wheels via a pair of output members to run a vehicle.

PRIOR ART DOCUMENT

Patent Document

Patent Document 1: WO2021/131204

SUMMARY OF INVENTION

The rotating electrical machine can be used in combination with a power transmission mechanism such as a reduction mechanism, an acceleration mechanism, and a transmission mechanism. However, when an attempt is made to provide the rotating electrical machine and the power transmission mechanism separately rather than as a unit, an efficient layout cannot be implemented, and as a result, an overall size may become larger. Therefore, a unit having a high layout property is desired.

The present invention has been made in consideration of such a problem, and an object thereof is to improve the layout property of the unit.

A unit according to an embodiment of the present invention includes: a rotating electrical machine; an inverter located in an outer periphery of the rotating electrical machine; a first gear connected downstream of the rotating electrical machine; a second gear to mesh with the first gear; a third gear connected downstream of the second gear via a shaft; and a fourth gear to mesh with the third gear. The shaft has a portion that overlaps a stator of the rotating electrical machine when viewed in a radial direction, and the inverter has a portion that overlaps the second gear when viewed in an axial direction.

According to this embodiment, the second gear and the third gear are separated with respect to a shaft that passes through the outer periphery (outer peripheral space) of a main body of the rotating electrical machine. That is, the second gear and the third gear are separated by the shaft that extends to pass through the outer periphery of the main body of the rotating electrical machine. Accordingly, the interference between the second gear and a fourth gear or a component connected to the fourth gear (for example, a differential gear) can be avoided, and a dimension in the axial direction can be reduced, and further, the inverter is caused to overlap the second gear, that is, the inverter is disposed close to the shaft to overlap the second gear, which can contribute to reduce the unit in size. Therefore, a layout property of the unit can be improved.

DESCRIPTION OF EMBODIMENTS

Hereinafter, an embodiment of the present invention will be described with reference to the accompanying drawings.

Figure 1:
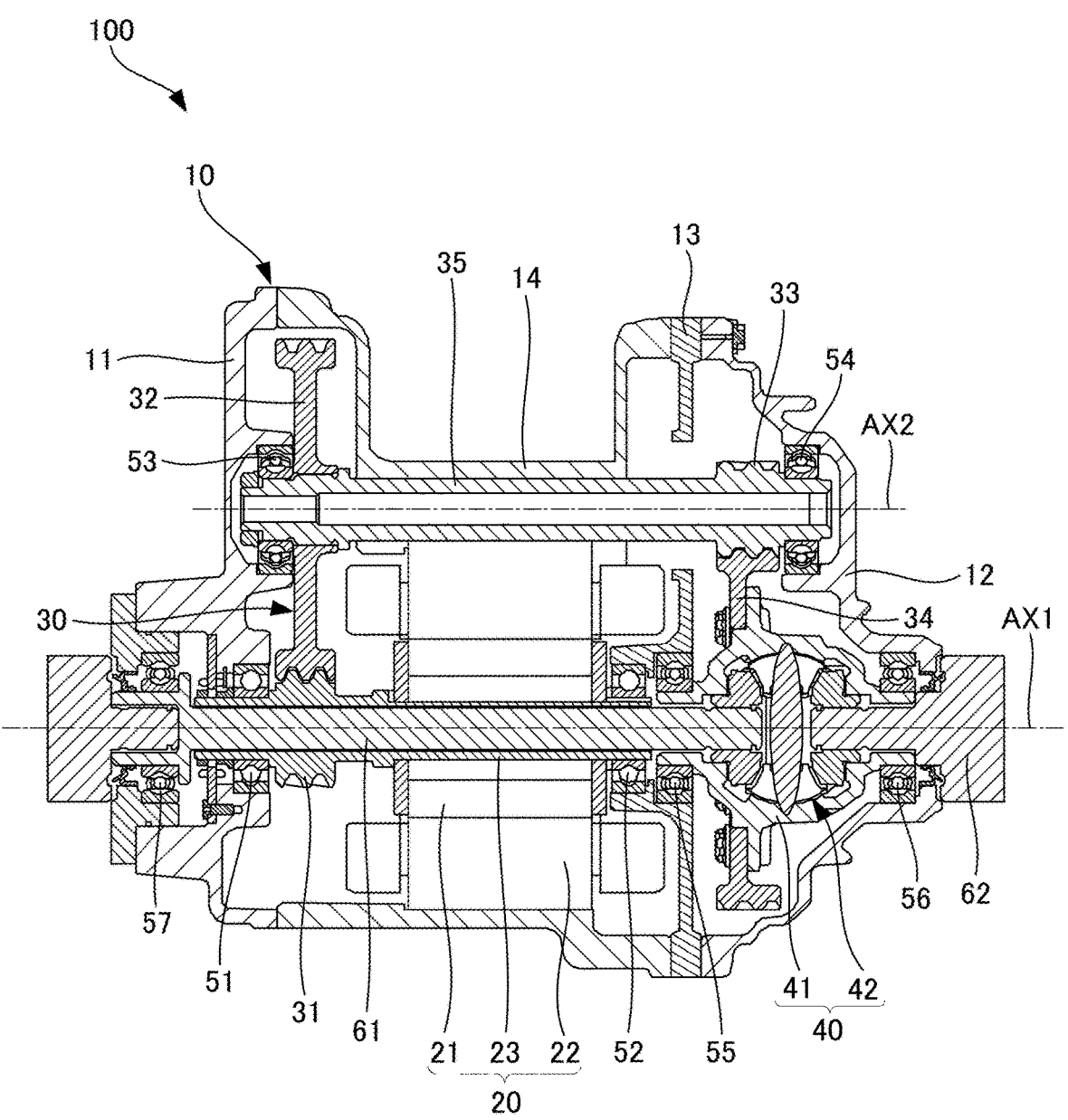
FIG. 1 is a schematic configuration diagram of a unit according to the present embodiment.

FIG. 1 is a schematic configuration diagram of a unit 100 according to the present embodiment. A unit can also be referred to as, for example, a motor unit (a unit including at least a motor) or a power transmission device (a device including at least a power transmission mechanism). The motor is a rotating electrical machine having an electric motor function and/or a generator function (at least one of the electric motor function and the generator function). The power transmission mechanism is, for example, a gear mechanism and/or a differential gear mechanism. The device (unit) including the motor and the power transmission mechanism is included in concepts of both the motor unit and the power transmission device.

The unit 100 includes a housing 10, a rotating electrical machine 20, a reduction mechanism 30, and a differential gear 40. The unit 100 is mounted on an electric vehicle, and the vehicle is an electric vehicle. The housing 10 includes a first cover 11, a second cover 12, a plate 13, and a case 14. The rotating electrical machine 20, the reduction mechanism 30, and the differential gear 40 are accommodated in the housing 10. The first cover 11 closes an opening of the cylindrical case 14 from one side in an axial direction (left side in FIG. 1), and the second cover 12 closes an opening of the case 14 from the other side in the axial direction via the plate 13. The rotating electrical machine 20 is provided in the case 14. The rotating electrical machine 20 is provided with one side in the axial direction as an output side.

The rotating electrical machine 20 includes a rotor 21, a stator 22, and a rotation shaft 23, and constitutes a drive source of the vehicle. The rotor 21 is provided on an outer periphery of the rotation shaft 23. The stator 22 is provided in the case 14 and accommodates the rotor 21. The rotation shaft 23 protrudes from the rotor 21 toward both sides in the axial direction, and is supported by a bearing 51 provided on the first cover 11 and a bearing 52 provided on the plate 13.

The rotation shaft 23 has a hollow structure. A first drive shaft 61 passes through the rotation shaft 23 from one side in the axial direction. The first drive shaft 61 further passes through the plate 13 and is assembled to the differential gear 40. A bearing holding holes is formed in a portion of the plate 13 through which the first drive shaft 61 passes. In the bearing holding hole, the bearing 52 is provided from one end side in the axial direction, and the bearing 55 is provided from the other end side in the axial direction.

The reduction mechanism 30 is a gear mechanism and includes a first gear 31, a second gear 32, a third gear 33, a fourth gear 34, and a long shaft 35. The first gear 31 and the fourth gear 34 are disposed on a first axis AX1 together with the rotating electrical machine 20. In other words, the rotating electrical machine 20, the first gear 31, and the fourth gear 34 are disposed coaxially with respect to the first axis AX1. In other words, a plurality of elements (components, portions, and the like) being disposed on an N-th axis (N is a natural number) is synonymous with the plurality of elements being disposed coaxially with respect to the N-th axis. Similarly, the second gear 32 and the third gear 33 are disposed on a second axis AX2.

Both the first axis AX1 and the second axis AX2 constitute axes of the unit 100 and extend along the same direction. Therefore, extension directions of the first axis AX1 and the second axis AX2 both correspond to the axial direction of the unit 100. That is, the axial direction means an axial direction of the rotation shaft of a component (for example, the motor, the gear mechanism, and the differential gear mechanism) that constitutes the unit. A radial direction of the unit 100 is a direction orthogonal to the first axis AX1 or the second axis AX2. The first axis AX1 constitutes an axis of the rotation shaft 23 and the differential gear 40, and the second axis AX2 constitutes an axis of the long shaft 35.

The first gear 31 is connected downstream of the rotating electrical machine 20. The downstream is a power output side, and the rotor 21 and the stator 22 that generate power are used as references for the downstream of the rotating electrical machine 20. Therefore, the downstream of the rotating electrical machine 20 can be said to be the downstream of the stator 22. Alternatively, the rotation shaft 23 does not need to be understood as a component of the rotating electrical machine 20 in terms of positional relation in power transmission. The downstream is the power output side, whereas the upstream is a power input side.

The first gear 31 is connected downstream of the rotating electrical machine 20 to be capable of transmitting power. The connection may be made via other configurations (for example, a clutch or other gear mechanisms). The first gear 31 is provided closer to one side in the axial direction than the rotor 21, and is provided on a portion of the rotation shaft 23 between the rotor 21 and the bearing 51. The first gear 31 is integrally formed with the rotation shaft 23.

The second gear 32 meshes with the first gear 31. The second gear 32 includes a larger number of teeth than the first gear 31, and constitutes a first reduction gear stage together with the first gear 31. The second gear 32 is provided on the long shaft 35. The second gear 32 is integrated with the long shaft 35 by being press-fitted to the long shaft 35. The long shaft 35 extends along the rotation shaft 23 and passes through an outer periphery (outer peripheral space) of the stator 22.

Therefore, the long shaft 35 has a portion that overlaps the stator 22 when viewed in the radial direction. For example, this portion overlaps the stator 22 when viewed in the radial direction along a plane including the first axis AX1 and the second axis AX2. The expression "overlapping when viewed in a predetermined direction including a radial direction and an axial direction" means overlapping in the predetermined direction, and means that a plurality of elements are aligned in the predetermined direction. Therefore, when a drawing illustrates that a plurality of elements are aligned in a predetermined direction, it may be assumed that the specification contains a sentence explaining that the plurality of elements overlap when viewed in the predetermined direction.

The long shaft 35 extends through the plate 13 to the other end side in the axial direction further than the stator 22. An insertion hole for the long shaft 35 is provided in a portion of the plate 13 through which the long shaft 35 passes. The long shaft 35 is supported by a bearing 53 provided on the first cover 11 and a bearing 54 provided on the second cover 12.

The third gear 33 is provided on the long shaft 35. The long shaft 35 is located downstream of the second gear 32, and the third gear 33 is connected downstream of the second gear 32 via the long shaft 35. The third gear 33 is connected downstream of the second gear 32 via a part of the long shaft 35. The third gear 33 is provided on a portion of the long shaft 35 extending to the other side in the axial direction further than the stator 22. This portion is a portion closer to the other end side in the axial direction than the plate 13. The third gear 33 is provided on a portion between the stator 22 and the bearing 54, and is integrally formed with the long shaft 35.

On the long shaft 35, the second gear 32 is provided on one end side in the axial direction, and the third gear 33 is provided on the other end side in the axial direction. That is, the second gear 32 and the third gear 33 are disposed at two ends with respect to the long shaft 35, and are separated by the long shaft 35 that extends to pass through the outer periphery of the stator 22. Accordingly, interference between the second gear 32 and the fourth gear 34 or the differential gear 40 that is an example of a component connected to the fourth gear 34 can be avoided, and a dimension of the unit 100 in the axial direction can be reduced. The dimension in the axial direction can be reduced, for example, as compared with a case where the first gear 31 to the fourth gear 34 are collectively disposed on one side in the axial direction with respect to the stator 22. The second gear 32 and the third gear 33 are provided between the bearing 53 and the bearing 54 in the axial direction.

The fourth gear 34 meshes with the third gear 33. The fourth gear 34 is a final gear and is provided on the differential gear 40. The power from the rotating electrical machine 20 is transmitted from the fourth gear 34 to the differential gear 40. Therefore, the differential gear 40 is connected downstream of the fourth gear 34.

The fourth gear 34 includes a larger number of teeth than the third gear 33, and constitutes a second reduction gear stage together with the third gear 33. Therefore, in the reduction mechanism 30, a two-stage reduction is performed by the first gear 31 and the second gear 32, and the third gear 33 and the fourth gear 34. Accordingly, in order to ensure a reduction ratio, a diameter of a reduction gear can be reduced as compared with one-stage reduction. As a result, a constraint on a layout, such as a limitation on making the unit 100 compact, which is caused by the necessity to ensure an inter-axis distance corresponding to a large diameter of the reduction gear, are alleviated.

The differential gear 40 is the differential gear mechanism and is disposed on the first axis AX1. The differential gear 40 includes a differential case 41 and a differential unit 42. The differential case 41 is supported by the bearing 55 provided on the plate 13 and a bearing 56 provided on the second cover 12, and rotates together with the fourth gear 34. The fourth gear 34 is coaxially fixed to an outer wall portion of the differential case 41, and the differential case 41 accommodates the differential unit 42. The differential unit 42 distributes and outputs, to drive wheels in a left-right direction of the vehicle, the power input to the differential case 41 via the fourth gear 34.

The differential gear 40 protrudes in a direction away from the stator 22 with respect to the fourth gear 34. The differential gear 40 protrudes to have a portion, serving as a protruding portion, which protrudes more in the axial direction from the fourth gear 34. In other words, the differential gear 40 protrudes more in the direction away from the stator 22 than in a direction close to the stator 22 with respect to the fourth gear 34, and is disposed in the direction away from the stator 22 with respect to the fourth gear 34.

Accordingly, since the fourth gear 34 can be disposed closer to the stator 22 than in the case where the differential gear 40 protrudes in an opposite direction, the long shaft 35 is prevented from becoming longer. As a result, an influence of torsion of the long shaft 35 is reduced regarding a fact that the influence of the torsion increases as the long shaft 35 becomes longer. In addition, an increase in the dimension in the axial direction of the unit 100 is also prevented.

When the differential gear 40 is provided in this manner, the bearing 54 serving as a bearing that supports the long shaft 35 overlaps the differential gear 40 when viewed in the radial direction (for example, viewed in the radial direction along the plane including the first axis AX1 and the second axis AX2). Therefore, the dimension in the axial direction of the unit 100 on a straight line passing through the second axis AX2 can also be reduced.

On the differential unit 42, a first drive shaft 61 is attached from the one side in the axial direction, and a second drive shaft 62 is attached from the other side in the axial direction. The power from the rotating electrical machine 20 is transmitted, from the differential unit 42, to one drive wheel via the first drive shaft 61 and to the other drive wheel via the second drive shaft 62. The first drive shaft 61 is longer than the second drive shaft 62, so that a distance between the drive wheel and the differential gear 40 increases, thereby limiting a bending angle. The first drive shaft 61 is supported by a bearing 57 provided on the first cover 11.

The fourth gear 34 may also be understood as a part of the differential gear 40. That is, the fourth gear 34 may also be understood as one component of the differential gear 40. Also in this case, it can be understood that the differential gear 40 including the differential unit 42 that outputs the power from the rotating electrical machine 20 is connected downstream of the fourth gear 34 in such a manner that a part of the differential gear 40 is connected downstream of the fourth gear 34.

Figure 2:
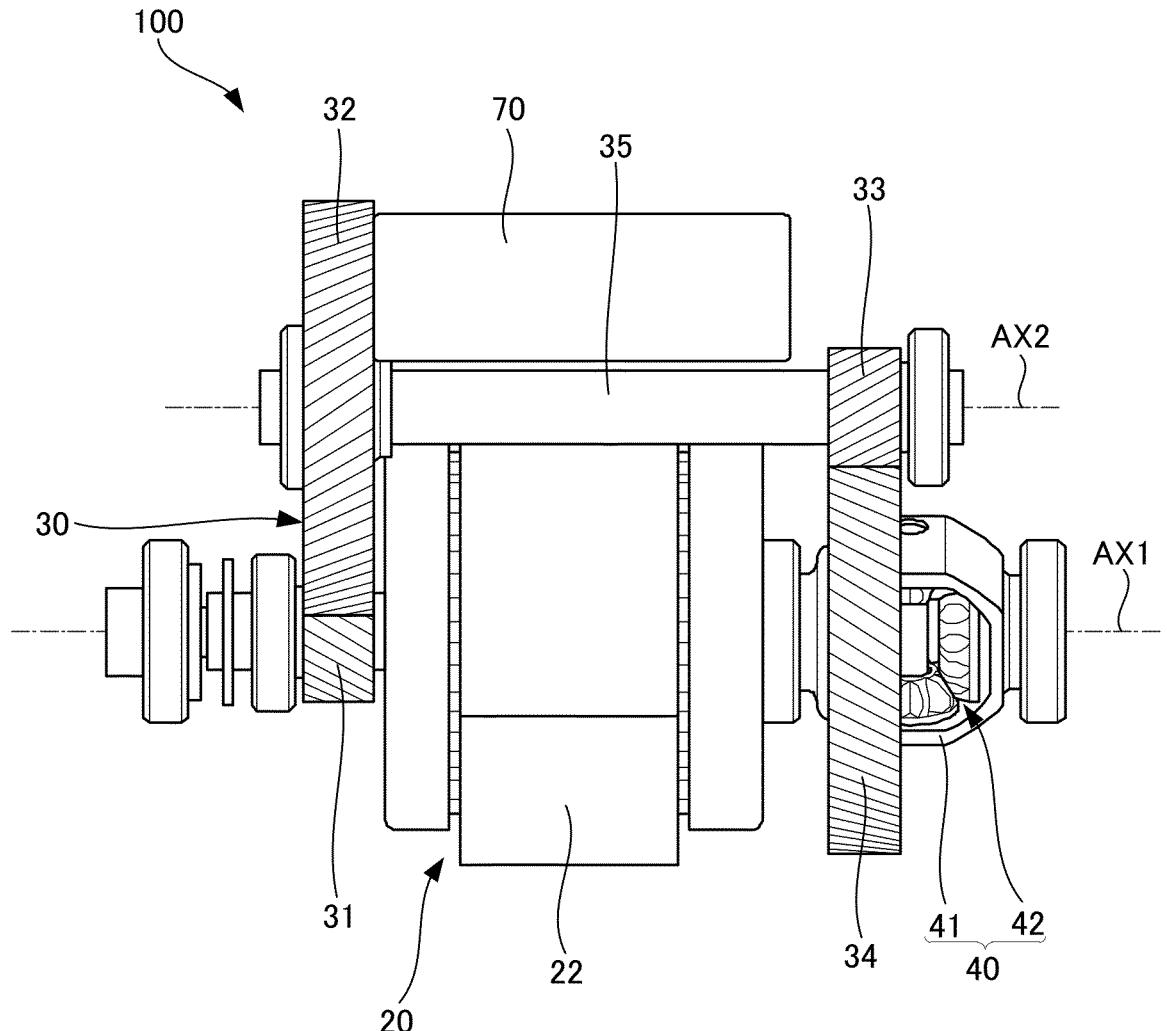
FIG. 2 is a first diagram illustrating an arrangement of an inverter.
Figure 3:
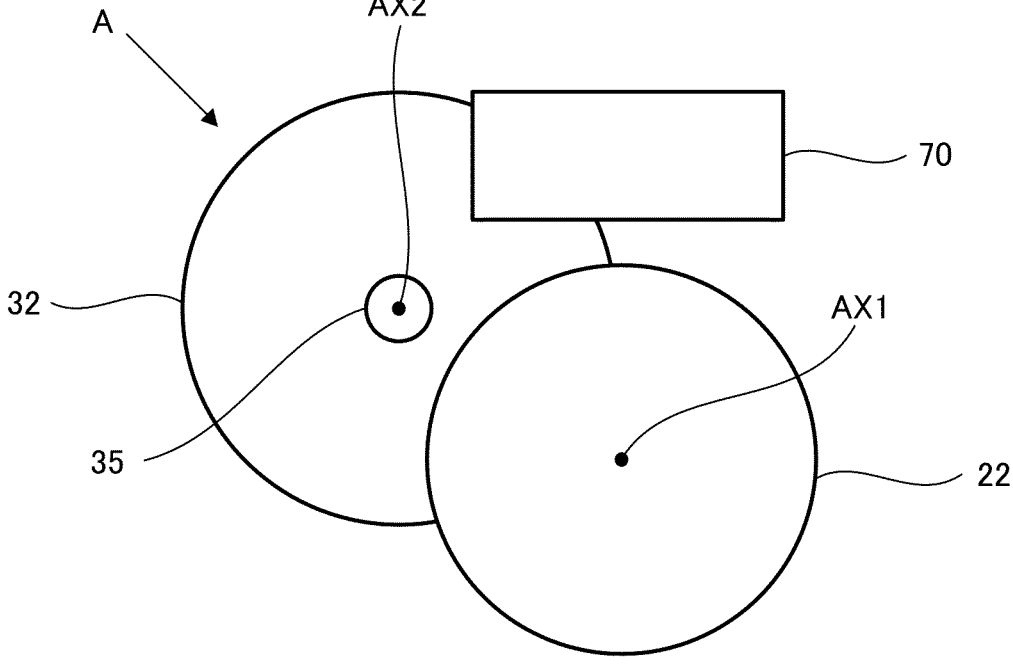
FIG. 3 is a second diagram illustrating the arrangement of the inverter.

FIGS. 2 and 3 are each a diagram illustrating an arrangement of the inverter 70. FIG. 2 illustrates an external appearance of the unit 100 when viewed in the radial direction in a state where the housing 10 is omitted. FIG. 3 illustrates an arrangement of a main configuration necessary for the description when viewed in the axial direction (when viewed from the right side in FIG. 2). As illustrated in FIGS. 2 and 3, the unit 100 further includes the inverter 70. The inverter 70 may be provided outside the housing 10. The inverter 70 may be accommodated in the housing 10. The inverter 70 has a portion that overlaps the second gear 32 when viewed in the axial direction. Accordingly, the inverter 70 is disposed close to the long shaft 35 to overlap the second gear 32, and as a result, the unit 100 is reduced in size.

The long shaft 35 has a portion that overlaps the stator 22 when viewed in an arrow A in FIG. 3, for example. "When viewed in an arrow A" is an example of "when viewed in a predetermined direction", and "when viewed in a predetermined direction" indicated by the arrow A is, for example, "when viewed in a radial direction" seen along the plane including the first axis AX1 and the second axis AX2.

Further, the long shaft 35 and the inverter 70 are offset from each other when viewed in the predetermined direction indicated by the arrow A. To be offset when viewed in a predetermined direction means that a plurality of elements are not aligned in the predetermined direction. In light of the above description, when a drawing illustrates that a plurality of elements are not aligned in a predetermined direction, it may be assumed that the description contains a sentence explaining that the plurality of elements are offset from each other when viewed in the predetermined direction.

When the long shaft 35 disposed on the outer periphery of the stator 22 and the inverter 70 are offset from each other when viewed in the predetermined direction indicated by the arrow A, the inverter 70 is disposed not in a direction in which a main body of the rotating electrical machine 20 and the long shaft 35 are aligned, but in a direction shifted from this direction. As a result, an increase in the dimension in the direction in which the stator 22 and the long shaft 35 are aligned is prevented. A space for disposing the inverter 70 is easily secured by increasing a gear diameter of the second gear 32.

Next, main functions and effects of the present embodiment will be described.

(1) The unit 100 includes: the rotating electrical machine 20; the inverter 70 located in an outer periphery of the rotating electrical machine 20; the first gear 31 connected downstream of the rotating electrical machine 20; the second gear 32 to mesh with the first gear 31; the third gear 33 connected downstream of the second gear 32 via the long shaft 35; and the fourth gear 34 to mesh with the third gear 33. The long shaft 35 has the portion that overlaps the stator 22 of the rotating electrical machine 20 when viewed in the radial direction, and the inverter 70 has the portion that overlaps the second gear 32 when viewed in the axial direction.

According to such a configuration, the second gear 32 and the third gear 33 are separated with respect to the long shaft 35 that passes through the outer periphery of the stator 22. That is, the second gear 32 and the third gear 33 are separated by the long shaft 35 that extends to pass through the outer periphery of the stator 22. Accordingly, the interference between the second gear 32 and the fourth gear 34 or the component connected to the fourth gear 34 (for example, the differential gear 40) can be avoided, and the dimension in the axial direction can be reduced, and further, the inverter 70 is caused to overlap the second gear 32, that is, the inverter 70 is disposed close to the long shaft 35 to overlap the second gear 32, which can contribute to reduce the unit 100 in size. Therefore, the layout property of the unit 100 can be improved.

(2) In the unit 100, when viewed in the predetermined direction indicated by the arrow A, the long shaft 35 has the portion that overlaps the stator 22, and the long shaft 35 and the inverter 70 are offset from each other. According to such a configuration, the inverter 70 can be disposed not in the direction in which the stator 22 and the long shaft 35 are aligned, but in the direction shifted from this direction. As a result, an increase in the dimension in this direction can be prevented.

(3) In the unit 100, the rotating electrical machine 20, the first gear 31, and the fourth gear 34 are disposed on the first axis AX1, and the second gear 32 and the third gear 33 are disposed on the second axis AX2. According to such a configuration, the gears of the reduction mechanism 30 are coaxially disposed with respect to two axes of the first axis AX1 and the second axis AX2, so that the unit 100 can be made compact in the radial direction. In addition, the rotating electrical machine 20 is also disposed on the first axis AX1, so that the unit 100 can be made even more compact. In particular, when an outer diameter of the stator 22 is close to a gear diameter of the fourth gear 34 provided on the differential gear 40, such an arrangement is advantageous for compactness.

(4) The unit 100 further includes the differential gear 40 connected downstream of the fourth gear 34. The differential gear 40 is disposed on the first axis AX1 and protrudes in the direction away from the stator 22 with respect to the fourth gear 34. According to such a configuration, the long shaft 35 is prevented from becoming longer as compared with the case where the differential gear 40 protrudes in the opposite direction. Therefore, the influence of the torsion of the long shaft 35 can be reduced, and an increase in the dimension in the axial direction of the unit 100 can also be prevented.

(5) In the unit 100, the bearing 54 that supports the long shaft 35 overlaps the differential gear 40 when viewed in the radial direction. According to such a configuration, the dimension in the axial direction of the unit 100 on the straight line passing through the second axis AX2 can also be reduced.

Although the embodiment of the present invention has been described above, the above embodiment is merely a part of application examples of the present invention, and is not intended to limit the technical scope of the present invention to the specific configurations of the above embodiment.

The present application claims a priority based on Japanese Patent Application No. 2022-095068 filed with the Japan Patent Office on Jun. 13, 2022, all the contents of which are hereby incorporated by reference.

DESCRIPTION OF REFERENCE SIGNS

10 housing
20 rotating electrical machine
21 rotor
22 stator
23 rotation shaft
30 reduction mechanism
31 first gear
32 second gear
33 third gear
34 fourth gear
35 long shaft (shaft)
40 differential gear
54 bearing
70 inverter
100 unit
AX1 first axis
AX2 second axis

The invention claimed is:

1. A unit comprising:
a rotating electrical machine;
an inverter located in an outer periphery of the rotating electrical machine;
a first gear connected downstream of the rotating electrical machine;
a second gear to mesh with the first gear;
a third gear connected downstream of the second gear via a shaft;
a fourth gear to mesh with the third gear; and
a differential gear connected downstream of the fourth gear, wherein
the shaft has a portion that overlaps a stator of the rotating electrical machine when viewed in a radial direction,
the inverter has a portion that overlaps the second gear when viewed in an axial direction,
the rotating electrical machine, the first gear, the fourth gear, and the differential gear are disposed on a first axis,
the second gear and the third gear are disposed on a second axis,
and
the differential gear protrudes in a direction away from the stator with respect to the fourth gear.

2. The unit according to claim 1, wherein
when viewed in a predetermined direction, the shaft has a portion that overlaps the stator, and the shaft and the inverter are offset from each other.

3. The unit according to claim 1, wherein
a bearing that supports the shaft overlaps the differential gear when viewed in the radial direction.

\* \* \* \* \*